United States Patent
Okazaki

(10) Patent No.: US 10,065,141 B2
(45) Date of Patent: Sep. 4, 2018

(54) CERAMIC HONEYCOMB STRUCTURE AND ITS PRODUCTION METHOD

(71) Applicant: HITACHI METALS, LTD., Tokyo (JP)

(72) Inventor: Shunji Okazaki, Miyako-gun (JP)

(73) Assignee: HITACHI METALS, LTD., Tokyo (JP)

(*) Notice: Subject to any disclaimer, the term of this patent is extended or adjusted under 35 U.S.C. 154(b) by 265 days.

(21) Appl. No.: 15/191,735

(22) Filed: Jun. 24, 2016

(65) Prior Publication Data

US 2016/0303500 A1    Oct. 20, 2016

Related U.S. Application Data

(62) Division of application No. 14/762,071, filed as application No. PCT/JP2014/074683 on Sep. 18, 2014, now Pat. No. 9,649,587.

(30) Foreign Application Priority Data

Sep. 24, 2013 (JP) .................. 2013-197383

(51) Int. Cl.
C04B 38/00 (2006.01)
C04B 38/06 (2006.01)
(Continued)

(52) U.S. Cl.
CPC ..... B01D 46/2429 (2013.01); B01D 39/2068 (2013.01); C04B 33/04 (2013.01);
(Continued)

(58) Field of Classification Search
CPC ............... C04B 38/0006; C04B 38/06; C04B 2235/5418
See application file for complete search history.

(56) References Cited

U.S. PATENT DOCUMENTS 5,141,686 A    8/1992 Murtagh
6,773,481 B2   8/2004 Noguchi et al.
(Continued)

FOREIGN PATENT DOCUMENTS

JP    2002-219319 A    8/2002
JP    2003-040687 A    2/2003
(Continued)

OTHER PUBLICATIONS

International Search Report of PCT/JP2014/074683 dated Dec. 16, 2014 [PCT/ISA/210].
(Continued)

*Primary Examiner* — Erin Snelting
(74) *Attorney, Agent, or Firm* — Sughrue Mion, PLLC

(57) ABSTRACT

A ceramic honeycomb structure including large numbers of flow paths partitioned by porous cell walls; (a) the cell walls having porosity of 55-65%; and (b) in a pore diameter distribution in the cell walls measured by mercury porosimetry, (i) a pore diameter at a cumulative pore volume corresponding to specific percentages of the total pore volume being within specific ranges and satisfying specific relationships; (ii) the difference of a logarithm of the pore diameter at a cumulative pore volume corresponding to 20% of the total pore volume and a logarithm of the pore diameter at 80% being 0.39 or less; and (iii) the volume of pores of more than 100 μm being 0.05 cm$^3$/g or less.

2 Claims, 2 Drawing Sheets

(51) Int. Cl.
*B01D 46/24* (2006.01)
*F01N 3/022* (2006.01)
*C04B 35/195* (2006.01)
*B01D 39/20* (2006.01)
*C04B 33/04* (2006.01)
*C04B 33/30* (2006.01)
*C04B 111/00* (2006.01)

(52) U.S. Cl.
CPC ............ *C04B 33/30* (2013.01); *C04B 35/195* (2013.01); *C04B 38/0006* (2013.01); *C04B 38/06* (2013.01); *F01N 3/0222* (2013.01); B01D 2046/2433 (2013.01); B01D 2046/2437 (2013.01); B01D 2046/2496 (2013.01); B01D 2279/30 (2013.01); C04B 2111/0081 (2013.01); C04B 2111/00793 (2013.01); C04B 2235/3217 (2013.01); C04B 2235/349 (2013.01); C04B 2235/3418 (2013.01); C04B 2235/5418 (2013.01); C04B 2235/5436 (2013.01); C04B 2235/606 (2013.01); C04B 2235/6021 (2013.01); F01N 2330/48 (2013.01); Y02T 10/20 (2013.01)

(56) References Cited

U.S. PATENT DOCUMENTS

| | | | |
|---|---|---|---|
| 6,818,580 B2 | 11/2004 | Kumazawa et al. | |
| 7,141,089 B2 | 11/2006 | Beall et al. | |
| 7,520,911 B2 | 4/2009 | Beall et al. | |
| 7,704,442 B2 | 4/2010 | Noguchi et al. | |
| 8,119,234 B2 | 2/2012 | Backhaus-Ricoult et al. | |
| 8,500,840 B2 | 8/2013 | Okazaki et al. | |
| 8,636,821 B2 | 1/2014 | Okazaki | |
| 8,663,777 B2 | 3/2014 | Suwabe et al. | |
| 9,011,757 B2 | 4/2015 | Suwabe et al. | |
| 9,074,504 B2 | 7/2015 | Okazaki | |
| 2003/0041574 A1 | 3/2003 | Noguchi et al. | |
| 2003/0093982 A1 | 5/2003 | Suwabe et al. | |
| 2003/0166450 A1 | 9/2003 | Kumazawa | |
| 2004/0029707 A1 | 2/2004 | Beall et al. | |
| 2004/0261384 A1 | 12/2004 | Merkel et al. | |
| 2006/0003143 A1* | 1/2006 | Uchida | B01D 46/0001 428/116 |
| 2007/0119133 A1 | 5/2007 | Beall et al. | |
| 2009/0011919 A1 | 1/2009 | Noguchi et al. | |
| 2009/0220734 A1 | 9/2009 | Backhaus-Ricoult et al. | |
| 2010/0310819 A1 | 12/2010 | Suwabe et al. | |
| 2011/0135873 A1 | 6/2011 | Okazaki et al. | |
| 2012/0148792 A1 | 6/2012 | Okazaki | |
| 2012/0251768 A1* | 10/2012 | Sendo | C04B 35/195 428/116 |
| 2012/0317947 A1 | 12/2012 | Okazaki | |
| 2013/0214463 A1 | 8/2013 | Suwabe et al. | |
| 2014/0103560 A1 | 4/2014 | Okazaki | |

FOREIGN PATENT DOCUMENTS

| | | |
|---|---|---|
| JP | 2004-360654 A | 12/2004 |
| JP | 2005-530616 A | 10/2005 |
| JP | 2007-525612 A | 9/2007 |
| JP | 2009-517327 A | 4/2009 |
| JP | 2011-516371 A | 5/2011 |
| WO | 2007/108428 A1 | 9/2007 |
| WO | 2009/063997 A1 | 5/2009 |
| WO | 2010/013509 A1 | 2/2010 |
| WO | 2011/027837 A1 | 3/2011 |
| WO | 2011/102487 A1 | 8/2011 |

OTHER PUBLICATIONS

Communication from United States Patent and Trademark Office dated Oct. 28, 2016, in U.S. Appl. No. 14/762,071.

Communication from United States Patent and Trademark Office dated Jul. 13, 2016 in U.S. Appl. No. 14/762,071.

* cited by examiner

CERAMIC HONEYCOMB STRUCTURE AND ITS PRODUCTION METHOD

CROSS REFERENCE TO RELATED APPLICATIONS

This is a divisional of U.S. application Ser. No. 14/762,071 filed Jul. 20, 2015, which is a National Stage of International Application No. PCT/JP2014/074683, filed Sep. 18, 2014 (claiming priority based on Japanese Patent Application No. 2013-197383, filed Sep. 24, 2013), the contents of which are incorporated herein by reference in their entirety.

FIELD OF THE INVENTION

The present invention relates to a ceramic honeycomb filter for removing fine particles from exhaust gases discharged from diesel engines, particularly to a ceramic honeycomb structure constituting a ceramic honeycomb filter for removing fine particles having particle diameters of 50 nm or less (so-called nano-particles).

BACKGROUND OF THE INVENTION

Exhaust gases discharged from diesel engines contain particulate matter (PM) comprising as main components carbonaceous soot and soluble organic fractions (SOFs) comprising high-boiling-point hydrocarbons, which are likely to adversely affect humans and environment when discharged into the air. Accordingly, ceramic honeycomb filters have conventionally been attached to exhaust pipes of diesel engines for capturing PM.

An example of ceramic honeycomb filters for capturing PM in exhaust gases to clean them is shown in FIGS. 1 and 2. The ceramic honeycomb filter 10 comprises a ceramic honeycomb structure comprising porous cell walls 2 defining a large number of outlet-side-plugged flow paths 3 and inlet-side-plugged flow paths 4 and a peripheral wall 1, and upstream-side plugs 6a and downstream-side plugs 6c sealing the exhaust-gas-inlet-side end surface 8 and exhaust-gas-outlet-side end surface 9 of the outlet-side-plugged flow paths 3 and the inlet-side-plugged flow paths 4 alternately in a checkerboard pattern. The peripheral wall 1 of the ceramic honeycomb filter is fixed by grip members (not shown) of metal meshes or ceramics mats, etc. to prevent movement during operation, and disposed in a metal container (not shown).

In the ceramic honeycomb filter 10, an exhaust gas is cleaned as follows. As shown by dotted arrows in FIG. 2, an exhaust gas flows into the outlet-side-plugged flow paths 3 opening on the exhaust-gas-inlet-side end surface 8. While passing through the cell walls 2, particularly through communicating pores on and in the cell walls 2, PM in the exhaust gas is captured. The cleaned exhaust gas flows from the inlet-side-plugged flow paths 4 opening on the exhaust-gas-outlet-side end surface 9 to the air.

PM continuously captured by the cell walls 2 clogs communicating pores on and in the cell walls, resulting in increased pressure loss when the exhaust gas passes through the ceramic honeycomb filter. Accordingly, PM should be burned off to regenerate the ceramic honeycomb filter before the pressure loss reaches a predetermined level.

The ceramic honeycomb filter should meet the requirements of a high capturing ratio of fine particles and low pressure loss. However, because these requirements are in a contradictory relation, the optimization of the porosity, pore volume, opening pore diameters, etc. of cell walls to meet both requirements has conventionally been investigated.

Further, to meet recent stricter exhaust gas regulations, investigations have been conducted to provide exhaust-gas-cleaning apparatuses comprising both SCR apparatuses for removing NOx and honeycomb filters for removing fine particles. Thus, the honeycomb filters are required to have higher pressure loss characteristics than ever.

PM comprises numerous so-called nano-particles having diameters of 50 nm or less. Nano-particles are more accumulated in respiratory organs than larger particles having the same mass when inhaled. Also, because nano-particles have large surface areas per volume, they become more harmful when toxic chemical substance is adsorbed to their surfaces. Because the mass of nano-particles contained in PM is small, a current PM mass limit is insufficient, and it is expected to implement a particle number limit for suppressing the emission of nano-particles affecting the number of particles discharged, as a future exhaust gas regulation. Accordingly, the honeycomb filters are required to have not only excellent pressure loss characteristics, but also an improved capturing ratio of PM particles, particularly nano-particles, in terms of number in place of mass.

JP 2005-530616 A discloses a ceramic filter constituted by a cordierite honeycomb structure with ends plugged for capturing and burning fine particles discharged from diesel engines, d50/(d50+d90) determined from a pore diameter distribution being less than 0.70, a permeability factor Sf when soot is accumulated, which is defined by the formula of [d50/(d50+d90)]/[porosity (%)/100] being less than 1.55, and a thermal expansion coefficient (25° C. to 800° C.) being $17 \times 10^{-7}$/° C. or less, describing that with such a pore structure (pore diameter distribution and pore communications), small pressure loss can be kept even when PM is accumulated.

JP 2002-219319 A discloses a porous honeycomb filter having a main crystal phase of cordierite, and such a controlled pore diameter distribution that the volume of pores having pore diameters of less than 10 μm is 15% or less of the total pore volume, the volume of pores having pore diameters of 10-50 μm is 75% or more of the total pore volume, and the volume of pores having pore diameters exceeding 50 μm is 10% or less of the total pore volume. JP 2002-219319 A describes that because of the above pore diameter distribution, this porous honeycomb filter has high efficiency of capturing PM, etc., with suppressed pressure loss increase due to the clogging of pores. JP 2002-219319 A also describes that such pore diameter distribution can be controlled by adjusting the particle diameters of a silica component, one of cordierite-forming materials, and by lowering the concentration of kaolin.

JP 2003-40687 A discloses a ceramic honeycomb structure composed of cordierite as a main component, and having porosity of 55-65% and an average pore diameter of 15-30 μm, the total area of pores open on the cell wall surfaces being 35% or more of the total cell wall surface area. JP 2003-40687 A describes that this honeycomb ceramic structure exhibits high capturing efficiency with low pressure loss.

Though the exhaust-gas-cleaning filters described in JP 2005-530616 A, JP 2002-219319 A and JP 2003-40687 A have relatively high PM-capturing performance by the accumulation of PM, such PM-capturing performance is not necessarily sufficient at an early stage of use before PM is accumulated (when the ceramic honeycomb filters start to be freshly used or reused after regeneration). Particularly they fail to capture harmful, nano-sized PM sufficiently, but discharge it, causing serious problems under stricter exhaust gas regulations.

JP 2004-360654 A discloses a ceramic honeycomb filter whose cell walls have porosity of 55-75% and an average pore diameter of 15-40 μm, the total area of pores open on the cell wall surface being 10-30% of the total cell wall surface area, and pores having equivalent circle diameters of 5-20 μm being 300/mm² or more among those open on the cell wall surfaces. However, even the ceramic honeycomb filter described in JP 2004-360654 A fails to effectively capture nano-particles before PM is accumulated at an early stage of use, despite a mass-based capturing ratio of PM improved to some extent. Namely, it has a low number-based capturing efficiency of PM, less expected to meet the particle number limit.

WO 2011/102487 A1 discloses a ceramic honeycomb structure having cell walls having (a) porosity of 55-80%, and (b) a median pore diameter D50 of 5-27 μm when measured by mercury porosimetry; (c) an area ratio of pores open on the surface being 20% or more; (d) an area-based median pore opening diameter d50 (expressed by an equivalent circle diameter) of pores open on the surface being 10-45 μm; (e) the density of pores open on the surface, which have equivalent circle diameters of 10 μm or more and less than 40 μm, being 350/mm² or more; (f) the maximum inclination of a pore diameter distribution curve representing the relation of a cumulative pore volume to a pore diameter, which is obtained by mercury porosimetry measurement, being 1.6 or more; and (g) a ratio D50/d50 of the median pore diameter D50 to the median pore opening diameter d50 being 0.65 or less. WO 2011/102487 A1 describes that a ceramic honeycomb filter constituted by this ceramic honeycomb structure can effectively capture nano-particles largely affecting the number of particles discharged even at an early stage of use before PM is accumulated, resulting in an improved number-based capturing ratio of PM, with less deterioration of pressure loss characteristics after captured PM is accumulated.

However, when a ceramic honeycomb filter constituted by the ceramic honeycomb structure described in WO 2011/102487 A1 is used as an exhaust gas filter for diesel engine cars, a capturing ratio of nano-sized PM may be insufficient in a driving mode, in which driving and stopping are repeated on city roads, etc. Thus, further improvement of the number-based PM-capturing ratio is desired to meet increasingly stricter exhaust gas regulations.

JP 2009-517327 A discloses a porous cordierite honeycomb having high mechanical strength and heat shock resistance, meeting an average CTE of $9 \times 10^{-7}$/° C. or less between 25° C. and 800° C., and $M_A$<2220, and $M_T$>2660, wherein $M_A$=3645 ($I_A$)−106 (CTE)+19 (d90)+17 (porosity %) and $M_T$=4711 ($I_T$)+116 (CTE)−26 (d90)−28 (porosity %), $I_A$ is an I ratio of XRD measured in a longitudinal cross section of the honeycomb, and $I_T$ is an I ratio of XRD measured on cell wall surfaces of the honeycomb. JP 2009-517327 A describes that the porous honeycomb preferably has porosity of 40% or more and less than 54%, and a median pore diameter of 10 μm or more.

JP 2011-516371 A discloses a porous ceramic body formed by a polycrystalline ceramic having an anisotropic fine structure, which is constituted by oriented polycrystalline networks (reticular formations) having an anisotropic factor Af-pore-long meeting 1.2<Af-pore-long<5. JP 2011-516371 A describes that it has a narrow pore diameter distribution and porosity of more than 50%, a median pore diameter being in a range of 12-25 μm. It describes that this ceramic body exhibiting high strength, a low thermal expansion coefficient (CTE), and high porosity can be used for automobile substrates, particulate-removing filters for diesel engines and gasoline engines, functional filters such as catalyst filters having a partial or complete addition of NOx, etc.

WO 2011/027837 A1 discloses a ceramic honeycomb structure comprising cell walls having porosity of 40-60%, an area ratio of pores open on the cell wall surfaces (the total area of pore openings per a unit area of cell wall surfaces) being 15% or more, an area-median opening diameter of pores open on the cell wall surfaces, which is expressed by an equivalent circle diameter (diameter of a circle having the same area as the opening area of each pore), being 10 μm or more and less than 40 μm, the density of pores having equivalent circle diameters of 10 μm or more and less than 40 μm being 350/mm² or more, and the average circularity of pores having equivalent circle diameters of 10 μm or more and less than 40 μm being 1-2. WO 2011/027837 A1 describes that the ceramic honeycomb structure has an improved PM-capturing ratio with low pressure loss at an early stage after regeneration, thereby enabling the efficient capturing of nano-sized PM, which has been increasingly needed because of stricter exhaust gas regulations.

WO 2007/108428 A1 discloses a method for producing a honeycomb structure using an alumina source, a silica source, and a magnesia source each having particle diameters V50 at 50% by volume of 1-25 μm in a volume-based particle diameter distribution; and using a cordierite-forming material having a volume-based particle diameter ratio ($V_{all}90/V_{all}10$) of 10 or less, wherein $V_{all}10$ is a particle diameter at 10% by volume, and $V_{all}90$ is a particle diameter at 90% by volume, in a volume-based particle diameter distribution of the entire cordierite-forming material; the difference between $V_{all}90$ and $V_{all}10$ [width of a volume-based particle diameter distribution ($V_{all}90-V_{all}10$)] being 25 m or less. WO 2007/108428 A1 describes that a honeycomb structure obtained has high porosity and a sharp pore diameter distribution, useful for exhaust-gas-capturing filters, particularly for diesel engine particulate filters (DPF) for capturing particles (particulate), etc. in exhaust gases discharged from diesel engines.

However, when the honeycombs described in JP 2009-517327 A, JP 2011-516371 A, WO 2011/027837 A1 and WO 2007/108428 A1 are used for exhaust-gas-cleaning filters, the capturing performance of PM is not necessarily sufficient at an early stage of use before PM is accumulated (when ceramic honeycomb filters start to be freshly used or reused after regeneration), though it becomes high as PM is accumulated to some extent. Particularly the capturing efficiency of nano-sized PM, which has become important due to stricter exhaust gas regulations, is insufficient, failing to capture harmful nano-sized PM.

Object of the Invention

Accordingly, an object of the present invention is to provide a ceramic honeycomb structure effectively capturing nano-particles largely affecting the number of discharged particles, thereby exhibiting an improved number-based capturing ratio of PM, even before PM is accumulated at an early stage of use, and less suffering the deterioration of pressure loss characteristics when captured PM is accumulated, and its production method.

SUMMARY OF THE INVENTION

Thus, the ceramic honeycomb structure of the present invention comprises large numbers of flow paths partitioned by porous cell walls;

(a) the cell walls having porosity of 55-65%; and (b) in a pore diameter distribution in the cell walls measured by mercury porosimetry, (i) a pore diameter d2 at a cumulative pore volume corresponding to 2% of the total pore volume being 100-180 µm;

a pore diameter d5 at 5% being 55-150 µm;

a pore diameter d10 at 10% being 20 µm or more and less than 50 µm;

a pore diameter (median pore diameter) d50 at 50% being 12-23 µm;

a pore diameter d85 at 85% being 6 µm or more and less than 10 µm;

a pore diameter d90 at 90% being 4-8 µm;

a pore diameter d98 at 98% being 3.5 µm or less;

(d10−d90)/d50 being 1.3-2;

(d50−d90)/d50 being 0.45-0.7; and (d10−d50)/d50 being 0.75-1.4;

(ii) σ[=log(d20)−log(d80)] being 0.39 or less, wherein σ represents the difference between a logarithm of the pore diameter d20 at a cumulative pore volume corresponding to 20% of the total pore volume and a logarithm of the pore diameter d80 at 80%; and (iii) the volume of pores of more than 100 µm being 0.05 cm$^3$/g or less.

The porosity is preferably 56-64%. The median pore diameter d50 is preferably 12-22 µm. The σ is preferably 0.3 or less.

The method of the present invention for producing the above ceramic honeycomb structure comprises the steps of extruding a moldable material comprising a ceramic material, and a pore-forming material constituted by hollow resin particles, to form a predetermined green body; and drying and sintering the green body;

the moldable material containing 3-9% by mass of the pore-forming material per 100% by mass of the ceramic material;

in a curve of a cumulative volume to a particle diameter in the pore-forming material, a median particle diameter D50 being 35-53 µm, a particle diameter D5 at a cumulative volume corresponding to 5% of the total volume being 12-27 µm, a particle diameter D10 at a cumulative volume corresponding to 10% of the total volume being 15-30 µm, a particle diameter D90 at a cumulative volume corresponding to 90% of the total volume being 58-75 µm, a particle diameter D95 at a cumulative volume corresponding to 95% of the total volume being 65-85 µm, and D50/(D90−D10) being 0.85-1.30;

the ceramic material comprising 15-25% by mass of silica, 40-43% by mass of talc, and 15-30% by mass of alumina, based on 100% by mass of the ceramic material;

the silica having a median particle diameter D50 of 15-30 µm, D10 of 10-20 µm, and D90 of 40-60 µm, the percentage of particles having diameters of 5 µm or less being 1% or less by mass, the percentage of particles having diameters of 10 µm or less being 3% or less by mass, the percentage of particles having diameters of 100 µm or more being 3% or less by mass, and the percentage of particles having diameters of 200 µm or more being 1% or less by mass, and a particle diameter distribution deviation SD [=log(D80)−log (D20)] being 0.4 or less, wherein D20 represents a particle diameter at a cumulative volume corresponding to 20% of the total volume, D80 represents a particle diameter at a cumulative volume corresponding to 80% of the total volume, in a curve of a cumulative volume to a particle diameter, and D20<D80, the talc having a median particle diameter D50 of 5-15 µm, D10 of 10 µm or less, and D90 of 25 µm or more, and the alumina having a median particle diameter D50 of 3-10 µm, and D90 of 60 µm or less.

The moldable material preferably comprises 4-8% by mass of the pore-forming material per 100% by mass of the ceramic material.

DESCRIPTION OF THE PREFERRED EMBODIMENTS

[1] Ceramic Honeycomb Structure

Figure 1:
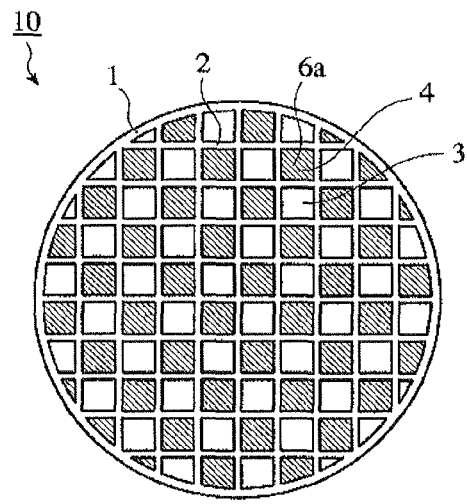
FIG. 1 is a front view schematically showing an example of ceramic honeycomb filters.
Figure 2:
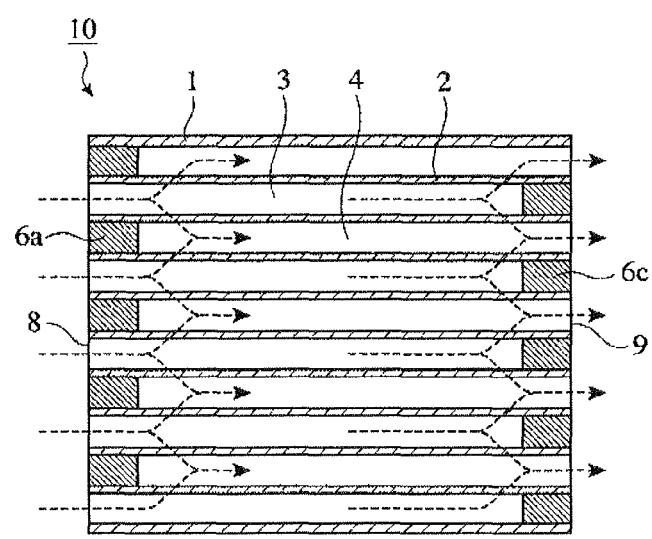
FIG. 2 is a longitudinal cross-sectional view schematically showing an example of ceramic honeycomb filters.

The ceramic honeycomb structure of the present invention comprises large numbers of flow paths partitioned by porous cell walls, (a) the cell walls having porosity of 55-65%; and (b) in a pore diameter distribution in the cell walls measured by mercury porosimetry, (i) a pore diameter d2 at a cumulative pore volume corresponding to 2% of the total pore volume being 100-180 µm;

a pore diameter d5 at 5% being 55-150 µm;

a pore diameter d10 at 10% being 20 µm or more and less than 50 µm;

a pore diameter (median pore diameter) d50 at 50% being 12-23 µm;

a pore diameter d85 at 85% being 6 µm or more and less than 10 µm;

a pore diameter d90 at 90% being 4-8 µm, a pore diameter d98 at 98% being 3.5 µm or less;

(d10−d90)/d50 being 1.3-2;

(d50−d90)/d50 being 0.45-0.7; and (d10−d50)/d50 being 0.75-1.4;

(ii) σ[=log(d20)−log(d80)] being 0.39 or less, wherein σ represents the difference between a logarithm of the pore diameter d20 at a cumulative pore volume corresponding to 20% of the total pore volume and a logarithm of the pore diameter d80 at 80%; and (iii) the volume of pores of more than 100 µm being 0.05 cm$^3$/g or less.

The ceramic honeycomb structure having such a structure can effectively capture fine PM largely affecting the number of particles discharged even at an early stage of use before PM is accumulated (when a ceramic honeycomb filter starts to be freshly used or reused after regeneration), resulting in an improved number-based capturing ratio of PM, with less deterioration of pressure loss characteristics when captured PM is accumulated.

(a) Porosity of Cell Walls

The cell walls have porosity of 55-65%. When the porosity is less than 55%, it is difficult to keep low pressure loss when captured PM is accumulated. When the porosity exceeds 65%, a capturing ratio of nano-sized PM decreases.

The porosity is preferably 56-64%, more preferably 57-63%. The porosity of cell walls is measured by mercury porosimetry described below.

(b) Pore Diameter Distribution in Cell Walls (i) d2, d5, d10, d50, d85, d90 and d98

In the pore diameter distribution curve of cell walls measured by mercury porosimetry, a pore diameter d2 at a cumulative pore volume corresponding to 2% of the total pore volume is 100-180 μm, a pore diameter d5 at 5% is 55-150 μm, a pore diameter d10 at 10% is 20 μm or more and less than 50 μm, a pore diameter (median pore diameter) d50 at 50% is 12-23 μm, a pore diameter d85 at 85% is 6 μm or more and less than 10 μm, a pore diameter d90 at 90% is 4-8 μm, a pore diameter d98 at 98% is 3.5 μm or less, (d10−d90)/d50 is 1.3-2, (d50−d90)/d50 is 0.45-0.7, and (d10−d50)/d50 is 0.75-1.4.

Figure 3:
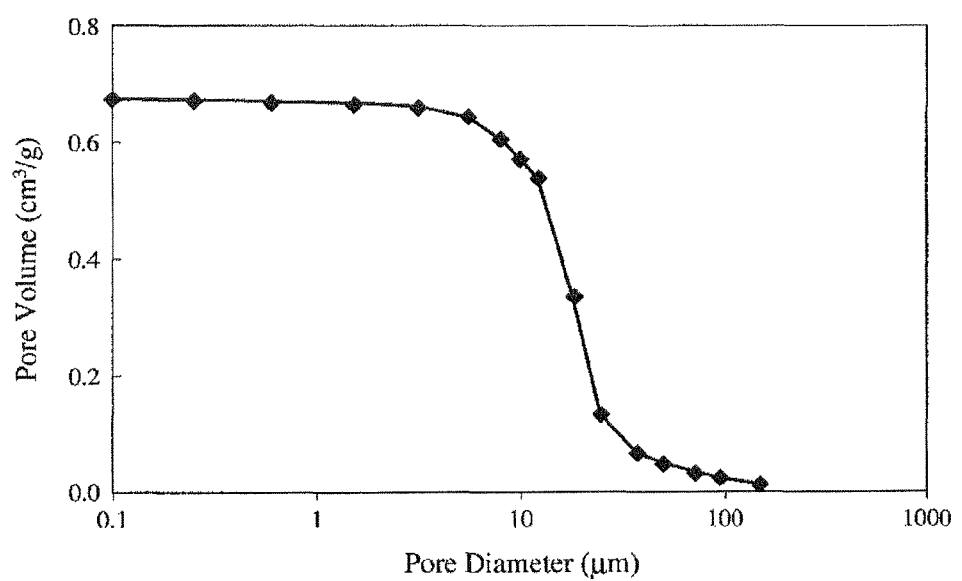
FIG. 3 is a graph showing a cumulative pore volume curve showing the relation between a pore diameter and a pore volume, which are measured by mercury porosimetry, in cell walls of the ceramic honeycomb structure of Example 1.

The pore diameter distribution curve of cell walls measured by mercury porosimetry is, as shown in FIG. 3, a curve of a cumulative pore volume plotted against a pore diameter (cumulative pore volume curve), which shows a cumulative pore volume in a range from a large pore diameter to a small pore diameter. Incidentally, d2>d5>d10>d50>d85>d90.

The pore diameter d2 at a cumulative pore volume corresponding to 2% of the total pore volume is 100-180 μm. When the pore diameter d2 is less than 100 μm, it is difficult to keep low pressure loss when captured PM is accumulated. When it is more than 180 μm, the capturing ratio of nano-sized PM is low. The d2 is preferably 110-150 μm, more preferably 110-140 μm.

The pore diameter d5 at a cumulative pore volume corresponding to 5% of the total pore volume is 55-150 μm. When the pore diameter d5 is less than 55 μm, it is difficult to keep low pressure loss when captured PM is accumulated. When it is more than 150 μm, the capturing ratio of nano-sized PM is low. The d5 is preferably 56-130 μm, more preferably 56-120 μm.

The pore diameter d10 at a cumulative pore volume corresponding to 10% of the total pore volume is 20 μm or more and less than 50 μm. When the pore diameter d10 is less than 20 μm, it is difficult to keep low initial pressure loss at the start of use. When it is 50 μm or more, the capturing ratio of nano-sized PM is low. The d10 is preferably 21-45 μm, more preferably 22-40 μm.

The median pore diameter d50 is 12-23 μm. When the median pore diameter d50 is less than 12 μm, it is difficult to keep low initial pressure loss at the start of use. When the median pore diameter d50 is more than 23 μm, there are few pores having diameters of 12-23 μm effective for capturing PM, resulting in a low capturing ratio of nano-sized PM. The median pore diameter d50 is preferably 12-22 μm, more preferably 13-21 μm.

The pore diameter d85 at a cumulative pore volume corresponding to 85% of the total pore volume is 6 μm or more and less than 10 When the pore diameter d85 is less than 6 μm, it is difficult to keep low initial pressure loss at the start of use. The d85 is preferably 7 μm or more, more preferably 7.5 μm or more. When the pore diameter d85 is 10 μm or more, the capturing ratio of nano-sized PM is low. The d85 is preferably 9.5 μm or less.

The pore diameter d90 at a cumulative pore volume corresponding to 90% of the total pore volume is 4-8 μm. When the pore diameter d90 is less than 4 μm, it is difficult to keep low initial pressure loss at the start of use. The d90 is preferably 5 μm or more, more preferably 5.5 μm or more. When the pore diameter d90 is more than 8 the capturing ratio of nano-sized PM is low. The d90 is preferably 7.5 μm or less, more preferably 7 μm or less.

The pore diameter d98 at a cumulative pore volume corresponding to 98% of the total pore volume is 3.5 μm or less. When the pore diameter d98 is more than 3.5 μm, the capturing ratio of nano-sized PM is low. The d98 is preferably 3 μm or less, more preferably 2.5 μm or less.

(d10−d90)/d50 is 1.3-2. When (d10−d90)/d50 is less than 1.3, it is difficult to keep low pressure loss when captured PM is accumulated. When it is more than 2, it is difficult to keep low initial pressure loss at the start of use. (d10−d90)/d50 is preferably 1.4-1.9, more preferably 1.5-1.8.

(d50−d90)/d50 is 0.45-0.7. When (d50−d90)/d50 is less than 0.45, it is difficult to keep low pressure loss when captured PM is accumulated. When it is more than 0.7, the capturing ratio of nano-sized PM is low. (d50−d90)/d50 is preferably 0.5-0.65, more preferably 0.55-0.6.

(d10−d50)/d50 is 0.75-1.4. When (d10−d50)/d50 is less than 0.75, it is difficult to keep low pressure loss when captured PM is accumulated. When it is more than 1.4, the capturing ratio of nano-sized PM is low. (d10−d50)/d50 is preferably 0.8-1.15, more preferably 0.85-1.1.

(ii) d20 and d80

In the pore diameter distribution curve of cell walls measured by mercury porosimetry, σ[=log(d20)−log(d80)] is 0.39 or less, wherein σ represents the difference between a logarithm of the pore diameter d20 at a cumulative pore volume corresponding to 20% of the total pore volume and a logarithm of the pore diameter d80 at 80%. When σ is more than 0.39, it is difficult to keep low initial pressure loss at the start of use. σ is preferably 0.3 or less, more preferably 0.25 or less.

(iii) Pore Volume of More than 100

In the pore diameter distribution curve of cell walls measured by mercury porosimetry, the volume of pores of more than 100 μm is 0.05 $cm^3/g$ or less. When the volume of pores of more than 100 μm is more than 0.05 $cm^3/g$, the capturing ratio of nano-sized PM is low. The volume of pores of more than 100 μm is preferably 0.04 $cm^3/g$ or less, more preferably 0.03 $cm^3/g$ or less.

(iv) Mercury Porosimetry

The measurement of a cumulative pore volume by mercury porosimetry can be conducted using, for example, Autopore III 9410 available from Micromeritics. A test piece cut out of the ceramic honeycomb structure is set in a measurement cell, and the cell is evacuated. Thereafter, mercury is introduced into the cell under pressure to measure the volume of mercury pressed into pores in the test piece. Because mercury is introduced into finer pores at higher pressure, the relation between a pore diameter and a cumulative pore volume (cumulative volume of pores in a range from the maximum pore diameter to a particular pore diameter) is determined from the relation between pressure and the volume of mercury intruded into pores. Mercury is first introduced into large pores and then into smaller pores successively. The porosity can be calculated from the measured total pore volume, using 2.52 $g/cm^3$ as the true density of cordierite.

Each of d2, d5, d10, d20, d50 (median pore diameter), d80, d90 and d98 represents a pore diameter (μm) at each pore volume corresponding to 2%, 5%, 10%, 20%, 50%, 80%, 90% and 98% of the total pore volume, in the curve of a cumulative pore volume to a pore diameter.

(c) Thermal Expansion Coefficient

The ceramic honeycomb structure preferably has a thermal expansion coefficient of $13 \times 10^{-7}/°$ C. or less between 20° C. and 800° C. in a flow path direction. Because the ceramic honeycomb structure having such a thermal expansion coefficient has high heat shock resistance, it is sufficiently acceptable for practical use as a ceramic honeycomb filter for removing fine particles from exhaust gases of diesel engines. The thermal expansion coefficient is preferably $3 \times 10^{-7}$ to $11 \times 10^{-7}$.

(d) Cell Wall Structure

The ceramic honeycomb structure preferably has an average cell wall thickness of 9-15 mil (0.229-0.381 mm), and an average cell density of 150-300 cpsi (23.3-46.5 cells/cm$^2$). With such cell wall structure, the ceramic honeycomb structure can keep low pressure loss at the start of use, resulting in an improved number-based PM-capturing ratio, and improved pressure loss characteristics when captured PM is accumulated. When the average cell wall thickness is less than 9 mil, the cell walls have low strength. When the average cell wall thickness exceeds 15 mil, it is difficult to keep low pressure loss. When the average cell density is less than 150 cpsi, the cell walls have low strength. When the average cell density exceeds 300 cpsi, it is difficult to keep low pressure loss. The flow path cross sections of cells may be polygonal (square, hexagonal, etc.), circular, elliptical, etc., and they may be asymmetric with different sizes between the inlet-side end and the outlet-side end.

(e) Materials of Cell Walls

Materials for cell walls are preferably heat-resistant ceramics comprising as main crystals alumina, mullite, cordierite, silicon carbide, silicon nitride, zirconia, aluminum titanate, lithium aluminum silicate, etc., because the honeycomb structure is used as a filter for cleaning exhaust gases discharged from diesel engines. Among them, ceramics comprising as main crystals cordierite or aluminum titanate having excellent heat shock resistance with low thermal expansion are preferable. When the main crystal phase is cordierite, other crystal phases such as spinel, mullite, sapphirine, etc. may be contained, and glass components may also be contained. When the main crystal phase is aluminum titanate, elements such as Mg, Si, etc. may be dissolved in the aluminum titanate crystal phase, which may contain other crystal phases such as mullite, etc., and glass components as grain boundary phases.

[2] Ceramic Honeycomb Filter

The ceramic honeycomb filter is obtained by alternately plugging the inlet and outlet sides of exhaust gas flow paths of the ceramic honeycomb structure of the present invention. Using the ceramic honeycomb structure of the present invention, a ceramic honeycomb filter can have an improved PM-capturing ratio with low pressure loss at an early stage of use, and suffers less pressure loss when PM is captured and accumulated. Plugs need not be formed at exhaust gas inlet and outlet ends of the flow paths, but may be formed in portions inside the inlet or outlet ends.

[3] Production Method of Ceramic Honeycomb Structure

The production method of the ceramic honeycomb structure of the present invention comprises the steps of extruding a moldable material comprising a ceramic material and a pore-forming material (hollow resin particles) to form a predetermined green body, and drying and sintering the green body;

the moldable material comprising 3-9% by mass of the pore-forming material per 100% by mass of the ceramic material;

the pore-forming material having a median particle diameter D50 of 35-53 µm, a particle diameter D5 of 12-27 µm at a cumulative volume corresponding to 5% of the total volume, a particle diameter D10 of 15-30 µm at a cumulative volume corresponding to 10% of the total volume, a particle diameter D90 of 58-75 µM at a cumulative volume corresponding to 90% of the total volume, a particle diameter D95 of 65-85 µm at a cumulative volume corresponding to 95% of the total volume, and D50/(D90–D10) of 0.85-1.30, in a curve of a cumulative volume to a particle diameter;

the ceramic material comprising 15-25% by mass of silica, 40-43% by mass of talc and 15-30% by mass of alumina, based on 100% by mass of the ceramic material;

silica having a median particle diameter D50 of 15-30 µm, D10 of 10-20 µm, and D90 of 40-60 µm, the percentage of particles having diameters of 5 µm or less being 1% or less by mass, the percentage of particles having diameters of 10 µm or less being 3% or less by mass, the percentage of particles having diameters of 100 µm or more being 3% or less by mass, the percentage of particles having diameters of 200 µm or more being 1% or less by mass, and a particle diameter distribution deviation SD [=log(D80)–log(D20)] being 0.4 or less, wherein SD represents a particle diameter distribution deviation, and in a curve of a cumulative volume to a particle diameter, D20 represents a particle diameter at a cumulative volume corresponding to 20% of the total volume, D80 represents a particle diameter at a cumulative volume corresponding to 80% of the total volume, and D20<D80;

talc having a median particle diameter D50 of 5-15 µm, D10 of 10 µm or less, and D90 of 25 µm or more; and alumina having a median particle diameter D50 of 3-10 µm, and D90 of 60 µm or less.

Such a method can produce the ceramic honeycomb structure of the present invention comprising large numbers of flow paths partitioned by porous cell walls, (a) the cell walls having porosity of 55-65%; and (b) in a pore diameter distribution in the cell walls measured by mercury porosimetry;

(i) a pore diameter d2 at a cumulative pore volume corresponding to 2% of the total pore volume being 100-180 µm;

a pore diameter d5 at 5% being 55-150 µm;

a pore diameter d10 at 10% being 20 µm or more and less than 50 µm;

a pore diameter (median pore diameter) d50 at 50% being 12-23 µm;

a pore diameter d85 at 85% being 6 µm or more and less than 10 µm;

a pore diameter d90 at 90% being 4-8 µm, a pore diameter d98 at 98% being 3.5 µm or less;

(d10–d90)/d50 being 1.3-2;

(d50–d90)/d50 being 0.45-0.7; and (d10–d50)/d50 being 0.75-1.4;

(ii) σ[=log(d20)–log(d80)] being 0.39 or less, wherein σ represents the difference between a logarithm of the pore diameter d20 at a cumulative pore volume corresponding to 20% of the total pore volume and a logarithm of the pore diameter d80 at 80%; and (iii) the volume of pores of more than 100 µm being 0.05 cm$^3$/g or less.

Pores in the ceramics are composed of those formed by melting the ceramic material during a sintering process, and those generated by burning off the pore-forming material. Accordingly, the sizes of pores generated by sintering ceramics can be controlled by adjusting the median particle diameters and particle diameter distributions of the ceramic material and the pore-forming material in the above ranges.

When a green body comprising the ceramic material and hollow resin particles as the pore-forming material is sintered in the production method of the present invention, the resin particles are burned off, leaving pores, and the ceramic material is sintered to form pores. In the present invention, by using hollow resin particles generating less heat by burning than solid resin particles, less cracking occurs in the sintering process of the green body. Pores formed by sintering the ceramic material are communicative with pores generated by the resin particles, so that the cell walls can have pores having the above diameter ranges measured by mercury porosimetry and well communicative from the surfaces to inside of the cell walls.

Because pores formed by sintering the ceramic material and pores formed from the pore-forming material have diameters for good communication, it is possible to obtain the ceramic honeycomb structure of the present invention having an improved capturing ratio of nano-sized PM, and improved pressure loss characteristics when captured PM is accumulated.

(1) Pore-Forming Material

Hollow resin particles are used as the pore-forming material in the present invention in an amount of 3-9% by mass per 100% by mass of the ceramic material. Outside the above amount range of the pore-forming material, it is difficult to form cell walls having the above pore structure. When the amount of the pore-forming material added is less than 3% by mass, it is difficult to form cell walls having porosity of 55% or more, resulting in deteriorated pressure loss characteristics when captured PM is accumulated. When the pore-forming material exceeds 9% by mass, the porosity of the cell walls may exceed 65%, resulting in a low capturing ratio of nano-sized PM. The amount of the pore-forming material added is preferably 4-8% by mass, more preferably 4.5-7% by mass.

The pore-forming material particles have a median particle diameter D50 of 35-53 μm. With the median particle diameter D50 of less than 35 μm, low pressure loss cannot be maintained when PM is captured and accumulated. When the median particle diameter D50 is more than 53 μm, coarse pores are formed, resulting in a low capturing ratio of nano-sized PM. The median particle diameter D50 of the pore-forming material particles is preferably 38-50 μm, more preferably 40-50 μm.

In the curve of a cumulative volume (accumulated volume of particles having up to a particular diameter) to a particle diameter in the pore-forming material particles, a particle diameter D5 at a cumulative volume corresponding to 5% of the total volume is 12-27 μm, a particle diameter D10 at a cumulative volume corresponding to 10% of the total volume is 15-30 μm, a particle diameter D90 at a cumulative volume corresponding to 90% of the total volume is 58-75 μm, a particle diameter D95 at a cumulative volume corresponding to 95% of the total volume is 65-85 μm, and D50/(D90−D10) is 0.9-1.3. With the pore-forming material particles having such particle diameter distribution, and the ceramic material having adjusted particle diameters and particle diameter distribution as described below, the cell walls having the above pore structure can be easily obtained. The particle diameter D5 at a cumulative volume corresponding to 5% of the total volume is preferably 14-25 μm, more preferably 16-23 The particle diameter D10 at a cumulative volume corresponding to 10% of the total volume is preferably 17-28 μm, more preferably 19-26 μm. The particle diameter D90 at a cumulative volume corresponding to 90% of the total volume is preferably 60-72 μm, more preferably 62-70 μm. The particle diameter D95 at a cumulative volume corresponding to 95% of the total volume is preferably 67-83 μm, more preferably 69-81 μm. D50/(D90−D10) is preferably 0.90-1.20, more preferably 1.0-1.15. The particle diameters of the pore-forming material can be measured by a particle diameter distribution meter (Microtrack MT3000 available from Nikkiso Co., Ltd.).

The pore-forming material particles preferably have sphericity of 0.5 or more. When the pore-forming material particles have sphericity of less than 0.5, the cell walls undesirably have large numbers of pores having sharp corners, which act as the starting sites of breakage, providing the honeycomb structure with low strength. The sphericity of the pore-forming material particles is preferably 0.7 or more, more preferably 0.8 or more. The sphericity of each pore-forming material particle is determined by dividing a projected area of the pore-forming material particle by the area of a circle having a diameter corresponding to the longest straight line connecting two points on a periphery of the pore-forming material particle through its center of gravity, and can be measured on an electron photomicrograph by an image analyzer.

The hollow resin particles are preferably foamed resin particles. Resins for the pore-forming material particles are suitably polymethylmethacrylate, polybutylmethacrylate, polyacrylates, polystyrenes, polyethylene, polyethylene terephthalate, methylmethacrylate/acrylonitrile copolymers, etc. The hollow resin particles preferably have a shell thickness of 0.1-3 μm, containing a gas such as hydrocarbons, etc. in the shell. The resin particles preferably have 70-95% of moisture on the surface. The resin particles preferably have a true specific gravity of 0.01-0.05.

(2) Ceramic Material

The ceramic material comprises 15-25% by mass of silica, 40-43% by mass of talc, and 15-30% by mass of alumina, based on 100% by mass of the ceramic material. The ceramic material is preferably a cordierite-forming material, which is obtained by mixing a silica source powder, an alumina source powder and a magnesia source powder, to form as a main crystal cordierite having a chemical composition comprising 42-56% by mass of $SiO_2$, 30-45% by mass of $Al_2O_3$, and 12-16% by mass of MgO. Pores in the ceramics comprising cordierite as a main crystal have pores formed by sintering silica and talc in the ceramic material, and pores generated by burning the pore-forming material. Accordingly, by adjusting the above pore-forming material, and the particle diameters and particle diameter distributions of the ceramic materials such as silica, talc, etc., it is possible to control pores in the cordierite-based ceramics. Among them, silica and the pore-forming material form most pores, largely contributing to the pore structure.

(a) Silica

It is known that silica is more stable at high temperatures than other materials, and melted and diffused at 1300° C. or higher to form pores. Accordingly, desired amounts of pores can be obtained by 15-25% by mass of silica. With more than 25% by mass of silica, the amount of kaolin and/or talc, other silica sources, should be reduced to have cordierite as a main crystal, resulting in a reduced effect of decreasing thermal expansion, which is obtained by the orientation of kaolin when extruded, and thus resulting in low heat shock resistance. When it is less than 15% by mass, small numbers of pores are open on the cell wall surfaces, unlikely obtaining low pressure loss when captured PM is accumulated. The silica content is preferably 17-23% by mass.

Silica used has a median particle diameter D50 of 15-30 µm, a particle diameter D10 of 10-20 µm at a cumulative volume corresponding to 10% of the total volume, and a particle diameter D90 of 40-60 µm at a cumulative volume corresponding to 90% of the total volume, in a curve of a cumulative volume to a particle diameter; and has a particle distribution, in which the percentage of particles having diameters of 5 m or less is 1% or less by mass, the percentage of particles having diameters of 10 µm or less being 3% or less by mass, the percentage of particles having diameters of 100 µm or more is 3% or less by mass, the percentage of particles having diameters of 200 µm or more is 1% or less by mass, and a particle diameter distribution deviation SD [=log(D80)−log(D20)] is 0.4 or less, wherein D20 represents a particle diameter at a cumulative volume corresponding to 20% of the total volume, D80 represents a particle diameter at a cumulative volume corresponding to 80% of the total volume, in a curve of a cumulative volume to a particle diameter, and D20<D80. Using silica particles having such particles distribution together with the pore-forming material, the ceramic honeycomb structure of the present invention having a particular pore diameter distribution can be obtained.

When silica has a median particle diameter D50 of less than 15 µm, the percentage of fine pores is high among pores open on the cell wall surfaces, resulting in increased pressure loss when captured PM is accumulated. On the other hand, D50 exceeding 30 µm provides many coarse pores, resulting in a low capturing ratio of nano-sized PM. The median particle diameter D50 of silica is preferably 17-28 µm, more preferably 19-26 µm.

When silica has D10 of less than 10 µm, the percentage of fine pores deteriorating pressure loss characteristics is undesirably high among pores open on the cell wall surfaces. On the other hand, D10 exceeding 20 µm undesirably increases the percentage of coarse pores lowering a capturing ratio of nano-sized PM. The D10 of silica is preferably 12-18 µm, more preferably 13-17 µm.

When silica has D90 of less than 40 µm, the percentage of fine pores deteriorating pressure loss characteristics is undesirably high among pores open on the cell wall surfaces. On the other hand, D90 exceeding 60 µm undesirably increases the percentage of coarse pores lowering a capturing ratio of nano-sized PM. The D90 of silica is preferably 45-55 µm, more preferably 47-53 µm.

When the percentage of silica particles having diameters of 5 µm or less is more than 1% by mass, or when the percentage of silica particles having diameters of 10 µm or less is more than 3% by mass, the percentage of fine pores is high among pores open on the cell wall surfaces, resulting in increased pressure loss when captured PM is accumulated. The percentage of silica particles having diameters of 5 µm or less is preferably 0.7% or less by mass, more preferably 0.2% or less by mass. The percentage of silica particles having diameters of 10 µm or less is preferably 2% or less by mass. When the percentage of particles having diameters of 100 µm or more is more than 3% by mass, or when the percentage of particles having diameters of 200 µm or more is more than 1% by mass, there are many coarse pores lowering a capturing ratio of nano-sized PM. The percentage of silica particles having diameters of 100 µm or more is preferably 2% or less by mass, and the percentage of silica particles having diameters of 200 µm or more is preferably 0.7% or less by mass, more preferably 0.2% or less by mass. The particle diameter distribution deviation SD of silica is preferably 0.36 or less, more preferably 0.33 or less.

The sphericity of silica particles is preferably 0.5 or more. When the sphericity of silica particles is less than 0.5, the cell walls undesirably have many pores having sharp corners acting as the starting sites of breakage, likely lowering the strength of the honeycomb structure. The sphericity of silica particles is preferably 0.6 or more, more preferably 0.7 or more. The sphericity of each silica particle is determined by dividing a projected area of the silica particle by the area of a circle having a diameter corresponding to the longest straight line connecting two points on a periphery of the silica particle through its center of gravity, and can be measured on an electron photomicrograph by an image analyzer.

The silica particles may be crystalline or amorphous, and amorphous silica particles are preferable to adjust the particle diameter distribution. Amorphous silica is produced by pulverizing an ingot obtained by melting a high-purity natural quartz at a high temperature. Silica particles may contain $Na_2O$, $K_2O$, and $CaO$ as impurities, but the total amount of the impurities is preferably 0.1% or less to prevent increase in a thermal expansion coefficient.

Silica particles having high sphericity are obtained by spraying finely pulverized high-purity natural silica into a high-temperature flame. Sprayed into a high-temperature flame, silica particles are melted to a spherical shape, resulting in amorphous silica having high sphericity. The diameters of spherical silica particles are preferably adjusted by such a method as classification, etc.

(b) Kaolin

As a silica component used for the cordierite-forming material, kaolin powder may be added in addition to silica powder. The kaolin powder is preferably 1-15% by mass. With more than 15% by mass of the kaolin powder, it may be difficult to adjust d98 to 5 µm or less in the pore diameter distribution of the ceramic honeycomb structure. With less than 1% by mass of the kaolin powder, the ceramic honeycomb structure has a large thermal expansion coefficient. The amount of the kaolin powder is more preferably 4-8% by mass.

When kaolin particles are oriented such that their c-axes are perpendicular to the longitudinal direction of the extrusion-molded honeycomb structure, the c-axes of cordierite crystals are in parallel to the longitudinal direction of the honeycomb structure, providing the honeycomb structure with a small thermal expansion coefficient. The shape of kaolin particles has large influence on the orientation of kaolin particles. The cleavage index of kaolin particles, which is an index indicating the shape of kaolin particles quantitatively, is preferably 0.80 or more, more preferably 0.85 or more. The cleavage index of kaolin particles can be determined by the formula of cleavage index=$I_{(002)}/[I_{(200)}+I_{(020)}+I_{(002)}]$, wherein $I_{(200)}$, $I_{(020)}$ and $I_{(002)}$ respectively represent the X-ray diffraction peak intensities of (200), (020) and (002) planes of the press-molded kaolin particles. The larger the cleavage index, the more the kaolin particles are oriented.

(c) Talc

The ceramic material comprises 40-43% by mass of talc based on 100% by mass thereof. In a curve of a cumulative volume (volume of particles accumulated up to a particular diameter) to a particle diameter, the talc has a median particle diameter D50 of 5-15 µm, a particle diameter D10 of 10 µm or less at a cumulative volume corresponding to 10% of the total volume, and a particle diameter D90 of 25 μm or more at a cumulative volume corresponding to 90% of the total volume. Talc, a compound comprising MgO and $SiO_2$ as main components, is reacted with nearby $Al_2O_3$ and melted in the sintering process, thereby forming pores. Accordingly, with talc having a small diameter mixed with an $Al_2O_3$ source, large numbers of small-diameter pores are dispersively formed in the cell walls, resulting in improved communicability of pores in the cell walls. Talc having a median particle diameter D50 of less than 5 μm provides low communicability of pores, resulting in low pressure loss characteristics when captured PM is accumulated. On the other hand, talc having a median particle diameter D50 of more than 15 μm forms many coarse pores, resulting in a low capturing ratio of nano-sized PM. The median particle diameter D50 of talc is preferably 6-14 μm, more preferably 8-12 μm.

Talc has D10 of preferably 8 μm or less, more preferably 7 μm or less, and D90 of preferably 25-45 μm, more preferably 25-40 μm or less.

To reduce the thermal expansion coefficient of a ceramic honeycomb structure having a cordierite-based crystal phase, talc is preferably in a planar shape. The morphology index, which is a measure of the flatness of talc particles, is preferably 0.5 or more, more preferably 0.6 or more, most preferably 0.7 or more. The morphology index is, as described in U.S. Pat. No. 5,141,686, determined by the formula of morphology index=Ix/(Ix+2Iy), wherein Ix and Iy respectively represent the diffraction intensities of (004) and (020) planes of talc, which are obtained by the X-ray diffraction measurement of planar talc particles. The larger the morphology index, the higher the flatness of talc particles.

Talc may contain as impurities $Fe_2O_3$, CaO, $Na_2O$, $K_2O$, etc. The amount of $Fe_2O_3$ is preferably 0.5-2.5% by mass in the magnesia source to obtain the desired particle size distribution. The total amount of $Na_2O$, $K_2O$ and CaO is preferably 0.50% or less by mass to have a low thermal expansion coefficient.

(d) Alumina

The ceramic material contains 15-30% by mass of alumina based on 100% by mass thereof. Alumina has a median particle diameter D50 of 3-10 and a particle diameter D90 of 60 μm or less at a cumulative volume corresponding to 90% of the total volume, in the curve of a cumulative volume to a particle diameter. With alumina having such median pore diameter and particle diameter distribution added, large numbers of small-diameter pores can be dispersed in the cell walls, resulting in improved communicability of pores in the cell walls, thereby providing a pore diameter distribution for the ceramic honeycomb structure of the present invention. Alumina has a median particle diameter D50 of preferably 4-9 μm, more preferably 5-8 μm, and D90 of preferably 50 μm or less, more preferably 25-40 μm. As the alumina component, aluminum hydroxide is preferably used, apart from alumina. The total amount of $Na_2O$, $K_2O$ and CaO as impurities in alumina or aluminum hydroxide is preferably 0.5% or less by mass, more preferably 0.3% or less by mass, most preferably 0.1% or less by mass.

(3) Production Method

The ceramic honeycomb structure is produced by dry-mixing a ceramic material and a pore-forming material with a binder, and if necessary, additives such as a dispersant, a surfactant, etc.; blending the resultant mixture with water to prepare a moldable material, which is extruded from a known die to form a honeycomb-shaped green body, by a known extrusion-molding method, such as a plunger method, a screw method, etc.; drying the green body; machining end and peripheral surfaces, etc. of the green body, if necessary; and then sintering the green body.

Sintering is conducted by controlling heating and cooling speeds in a continuous or batch furnace. When the ceramic material is a cordierite-forming material, it is kept at 1350-1450° C. for 1-50 hours to sufficiently form cordierite as a main crystal, and then cooled to room temperature. Particularly when a large ceramic honeycomb structure having an outer diameter of 150 mm or more and a length of 150 mm or more is produced, the temperature-elevating speed is preferably 0.2-10° C./hr in a binder-decomposing temperature range, for example, between 150° C. and 350° C., and 5-20° C./hr in a cordierite-forming temperature range, for example, between 1150° C. and 1400° C., thereby preventing cracking in the green body in the sintering process. The cooling is preferably conducted at a speed of 20-40° C./h in a temperature range of 1400° C. to 1300° C.

The resultant honeycomb structure can be plugged in desired flow path end portions by a known method to form a ceramic honeycomb filter. The plugs may be formed before sintering.

The present invention will be explained in more detail referring to Examples below, without intention of restricting the present invention thereto.

Examples 1-10 and Comparative Examples 1-10

Silica powder, talc powder and alumina powder, aluminum hydroxide powder and kaolin powder having the particle shapes (particle diameter, particle diameter distribution, etc.) shown in Tables 1-5 were mixed in the proportions shown in Table 7 (100 parts by mass in total), thereby obtaining each cordierite-forming material powder having a chemical composition comprising 50% by mass of $SiO_2$, 36% by mass of $Al_2O_3$ and 14% by mass of MgO.

This cordierite-forming material powder was mixed with a pore-forming material having the particle shape and true specific gravity shown in Table 6 in the proportion shown in Table 7, and then blended with methyl cellulose and water to prepare a plastically moldable ceramic material comprising the cordierite-forming material. The sphericity of each pore-forming material particle was determined by dividing the projected area A1 of each pore-forming material particle (determined from an electron microscopic image by an image analyzer) by the area A2 of a circle having a diameter corresponding to the longest straight line connecting two points on a periphery of the pore-forming material particle through its center of gravity, and the values of A1/A2 calculated on 20 particles were averaged.

TABLE 1

| Silica | Particle Size (μm) | | | Proportion (%) | | | |
|---|---|---|---|---|---|---|---|
| | D50[1] | D10 | D90 | ≤5 μm | ≤10 μm | ≥100 μm | ≥200 μm |
| A | 25 | 14.1 | 48.4 | 0.01 | 1.9 | 1.1 | 0.01 |
| B | 30 | 17.2 | 52.3 | 0.01 | 2.9 | 2.8 | 0.02 |
| C | 22 | 12.1 | 45.1 | 0.01 | 1.5 | 1.3 | 0.01 |
| D | 10 | 4.1 | 22.4 | 2.0 | 8.0 | 4.0 | 2.0 |
| E | 40 | 23.3 | 74.2 | 0.6 | 2.5 | 7.5 | 3.4 |
| F | 26 | 11.4 | 56.6 | 2.4 | 4.2 | 4.5 | 1.8 |
| G | 40 | 22.5 | 69.6 | 0.7 | 2.5 | 3.8 | 1.1 |
| H | 12 | 5.0 | 21.1 | 0 | 0.9 | 1.8 | 0.05 |
| I | 12 | 4.5 | 20.1 | 0 | 0.9 | 1.8 | 0.05 |

TABLE 1-continued

| Silica | SD[2] | Sphericity | Impurities (% by mass) | | |
|---|---|---|---|---|---|
| | | | CaO | Na₂O | K₂O |
| A | 0.32 | 0.68 | 0.001 | 0.0022 | 0.0024 |
| B | 0.38 | 0.57 | 0.001 | 0.0022 | 0.0024 |
| C | 0.35 | 0.85 | 0.001 | 0.0022 | 0.0021 |
| D | 0.54 | 0.71 | 0.001 | 0.0022 | 0.0024 |
| E | 0.39 | 0.55 | 0.001 | 0.0020 | 0.0024 |
| F | 0.48 | 0.62 | 0.001 | 0.0022 | 0.0024 |
| G | 0.37 | 0.55 | 0.001 | 0.0020 | 0.0024 |
| H | 0.46 | 0.61 | 0.001 | 0.0022 | 0.0024 |
| I | 0.47 | 0.61 | 0.001 | 0.0022 | 0.0024 |

Note:
[1]D50 represents a median particle diameter.
[2]SD represents a particle diameter distribution deviation.

TABLE 2

| Talc | Particle Size (μm) | | | Morphology Index | Impurities (% by mass) | | | |
|---|---|---|---|---|---|---|---|---|
| | D50[1] | D10 | D90 | | CaO | Na₂O | K₂O | Fe₂O₃ |
| A | 14 | 7.5 | 44 | 0.58 | 0.14 | 0.001 | 0.001 | 1.1 |
| B | 7 | 3.8 | 26 | 0.67 | 0.12 | 0.001 | 0.001 | 1.4 |
| C | 10 | 4.2 | 36 | 0.79 | 0.14 | 0.001 | 0.001 | 1.2 |
| D | 3 | 0.6 | 15 | 0.44 | 0.13 | 0.001 | 0.001 | 1.3 |
| E | 20 | 8 | 55 | 0.53 | 0.14 | 0.001 | 0.001 | 1.3 |
| F | 13 | 12 | 22 | 0.41 | 0.18 | 0.001 | 0.001 | 1.5 |
| G | 20 | 8 | 44 | 0.50 | 0.15 | 0.001 | 0.001 | 1.6 |
| H | 3 | 0.5 | 12 | 0.41 | 0.15 | 0.001 | 0.001 | 1.4 |

Note:
[1]D50 represents a median particle diameter.

TABLE 3

| Alumina | Particle Size (μm) | | Impurities (% by mass) | | |
|---|---|---|---|---|---|
| | D50[1] | D90 | CaO | Na₂O | K₂O |
| A | 7.8 | 19 | 0.001 | 0.15 | 0.001 |
| B | 8.0 | 19 | 0.001 | 0.14 | 0.001 |
| C | 8.2 | 19 | 0.001 | 0.13 | 0.001 |
| D | 4.5 | 9.5 | 0.001 | 0.15 | 0.001 |
| E | 4.9 | 9.5 | 0.001 | 0.13 | 0.001 |
| F | 2.4 | 15 | 0.001 | 0.12 | 0.001 |
| G | 11.0 | 25 | 0.001 | 0.15 | 0.001 |
| H | 8.4 | 15 | 0.001 | 0.15 | 0.001 |
| I | 2.4 | 15 | 0.001 | 0.15 | 0.001 |
| J | 7.9 | 38 | 0.001 | 0.16 | 0.001 |

Note:
[1]D50 represents a median particle diameter.

TABLE 4

| Material | D50[1] (μm) | Impurities (% by mass) | | |
|---|---|---|---|---|
| | | CaO | Na₂O | K₂O |
| Aluminum Hydroxide | 12.0 | 0.001 | 0.04 | 0.001 |

Note:
[1]D50 represents a median particle diameter.

TABLE 5

| Material | D50[1] (μm) | Cleavage Index | Impurities (% by mass) | | |
|---|---|---|---|---|---|
| | | | CaO | Na₂O | K₂O |
| Kaolin | 5.5 | 0.91 | 0.11 | 0.02 | 0.06 |

Note:
[1]D50 represents a median particle diameter.

TABLE 6

| Pore-Forming Material | Type | Particle Size (μm) | | | | |
|---|---|---|---|---|---|---|
| | | D50[1] | D5 | D10 | D90 | D95 |
| A | Hollow Resin | 38 | 14 | 17 | 61 | 66 |
| B | Hollow Resin | 52 | 23 | 29 | 74 | 84 |
| C | Hollow Resin | 45 | 20 | 25 | 67 | 81 |
| D | Hollow Resin | 25 | 3 | 6 | 65 | 69 |
| E | Hollow Resin | 54 | 5 | 9 | 79 | 88 |
| F | Hollow Resin | 36 | 9 | 13 | 55 | 63 |
| G | Hollow Resin | 57 | 11 | 15 | 75 | 86 |
| H | Hollow Resin | 25 | 4 | 8 | 45 | 53.4 |
| I | Graphite | 20 | 7 | 14 | 65 | 79 |
| J | Solid Resin | 41 | 13 | 19 | 65 | 74 |

| Pore-Forming Material | D50/(D90 − D10) | Sphericity | True Specific Gravity |
|---|---|---|---|
| A | 0.86 | 0.92 | 0.02 |
| B | 1.16 | 0.88 | 0.02 |
| C | 1.07 | 0.94 | 0.02 |
| D | 0.42 | 0.90 | 0.03 |
| E | 0.77 | 0.91 | 0.03 |
| F | 0.86 | 0.90 | 0.03 |
| G | 0.95 | 0.89 | 0.03 |
| H | 0.68 | 0.88 | 0.03 |
| I | 0.39 | 0.34 | 2.2 |
| J | 0.89 | 0.85 | 1.2 |

Note:
[1]D50 represents a median particle diameter.

The particle diameters and particle diameter distributions of the silica powder, the talc powder, the alumina powder, the aluminum hydroxide powder, the kaolin powder and the pore-forming material powder were measured by a particle diameter distribution meter (Microtrack MT3000 available from Nikkiso Co., Ltd.), and their median particle diameters D50, the percentages of particle diameters of 10 μm or less, the percentages of particle diameters of 100 μm or more, D90, D80, D20, and D10 were determined from the particle diameter distribution. The particle diameter distribution deviations SD were determined from D80 and D20.

TABLE 7

| | Silica | | Talc | | Alumina | |
|---|---|---|---|---|---|---|
| No. | Type | Parts by Mass | Type | Parts by Mass | Type | Parts by Mass |
| Example 1 | A | 17.5 | A | 41.0 | A | 22.8 |
| Example 2 | A | 17.5 | A | 41.0 | B | 22.8 |
| Example 3 | A | 17.5 | B | 41.0 | C | 22.8 |
| Example 4 | A | 16.1 | A | 41.0 | C | 22.0 |
| Example 5 | A | 16.1 | B | 41.0 | D | 22.0 |
| Example 6 | A | 16.1 | B | 41.0 | E | 22.0 |
| Example 7 | B | 18.2 | A | 41.1 | B | 23.3 |
| Example 8 | C | 18.2 | C | 41.1 | B | 23.3 |
| Example 9 | A | 18.2 | A | 41.1 | C | 23.3 |
| Example 10 | A | 17.5 | A | 41.0 | J | 22.8 |
| Com. Ex. 1 | D | 16.1 | D | 41.0 | F | 22.0 |
| Com. Ex. 2 | E | 16.1 | E | 41.0 | G | 22.0 |
| Com. Ex. 3 | F | 16.1 | F | 41.0 | H | 22.0 |
| Com. Ex. 4 | G | 18.2 | G | 41.1 | G | 23.3 |

TABLE 7-continued

| | Aluminum Hydroxide | Kaolin | Pore-Forming Material | |
|---|---|---|---|---|
| | | | | |
| Com. Ex. 5 | H | 18.2 | H | 41.1 | I | 23.3 |
| Com. Ex. 6 | I | 18.2 | H | 41.1 | I | 23.3 |
| Com. Ex. 7 | A | 17.5 | A | 41.0 | A | 22.8 |
| Com. Ex. 8 | D | 17.5 | A | 41.0 | A | 22.8 |
| Com. Ex. 9 | A | 17.5 | A | 41.0 | A | 22.8 |
| Com. Ex. 10 | E | 17.5 | E | 41.0 | G | 22.8 |

| | Aluminum Hydroxide | Kaolin | Pore-Forming Material | |
|---|---|---|---|---|
| No. | Parts by Mass | Parts by Mass | Type | Parts by Mass |
| Example 1 | 11.1 | 7.6 | A | 7.5 |
| Example 2 | 11.1 | 7.6 | A | 7.2 |
| Example 3 | 11.1 | 7.6 | A | 4.1 |
| Example 4 | 10.6 | 10.3 | A | 4.9 |
| Example 5 | 10.6 | 10.3 | A | 4.6 |
| Example 6 | 10.6 | 10.3 | A | 5.6 |
| Example 7 | 11.1 | 6.3 | B | 7.2 |
| Example 8 | 11.1 | 6.3 | C | 4.7 |
| Example 9 | 11.1 | 6.3 | C | 5.1 |
| Example 10 | 11.1 | 7.6 | A | 7.2 |
| Com. Ex. 1 | 10.6 | 10.3 | D | 2.4 |
| Com. Ex. 2 | 10.6 | 10.3 | E | 9.0 |
| Com. Ex. 3 | 10.6 | 10.3 | F | 5.0 |
| Com. Ex. 4 | 11.1 | 6.3 | G | 9.0 |
| Com. Ex. 5 | 11.1 | 6.3 | H | 1.8 |
| Com. Ex. 6 | 11.1 | 6.3 | I | 20.0 |
| Com. Ex. 7 | 11.1 | 7.6 | J | 6.5 |
| Com. Ex. 8 | 11.1 | 7.6 | A | 7.5 |
| Com. Ex. 9 | 11.1 | 7.6 | H | 2.0 |
| Com. Ex. 10 | 11.1 | 7.6 | C | 5.3 |

Each of the resultant moldable material was extruded to form a honeycomb-shaped green body, which was dried and machined to remove a peripheral portion. The green body was then sintered according to a schedule of 210 hours, which comprised heating at an average speed of 10° C./hr between room temperature and 150° C., at an average speed of 2° C./hr between 150° C. and 350° C., at an average speed of 20° C./hr between 350° C. and 1150° C., and at an average speed of 15° C./hr between 1150° C. and 1410° C.; keeping at the highest temperature of 1410° C. for 25 hours; and cooling at an average speed of 30° C./hr between 1400° C. and 1300° C., and at an average speed of 80° C./hr between 1300° C. and 100° C.) in a furnace. The sintered ceramic honeycomb was coated with a peripheral layer material comprising amorphous silica and colloidal silica on the peripheral surface, and then dried to obtain each ceramic honeycomb structure of Examples 1-10 and Comparative Examples 1-10 having an outer diameter of 266.7 mm, length of 304.8 mm, and the cell wall thickness and cell density shown in Table 8.

After flow path ends of each ceramic honeycomb structure were alternately plugged by filling a plugging material slurry of a cordierite-forming material, the plugging material slurry was dried and sintered, to produce each cordierite-based ceramic honeycomb filter of Examples and Comparative Examples. The sintered plugs were as long as 7-10 mm. In each Example and each Comparative Example, the same two ceramic honeycomb filters were produced.

One of the resultant ceramic honeycomb filters in each of Examples 1-10 and Comparative Examples 1-10 was measured with respect to a pore diameter distribution by mercury porosimetry and a thermal expansion coefficient, by the following methods. A test piece (10 mm×10 mm×10 mm) cut out of each ceramic honeycomb filter was set in a measurement cell of Autopore III available from Micromeritics, and the cell was evacuated. Thereafter, mercury was introduced into the cell under pressure to determine the relation between the pressure and the volume of mercury intruded into pores in the test piece, from which the relation between a pore diameter and a cumulative pore volume was determined. The mercury-intruding pressure was 0.5 psi ($0.35 \times 10^{-3}$ kg/mm$^2$), and constants used for calculating the pore diameter from the pressure were a contact angle of 130°, and a surface tension of 484 dyne/cm.

Calculated from the mercury porosimetry measurement results were a total pore volume, porosity, a pore diameter d2 at a cumulative pore volume corresponding to 2% of total pore volume, a pore diameter d5 at 5%, a pore diameter d10 at 10%, a pore diameter d20 at 20%, a pore diameter (median pore diameter) d50 at 50%, a pore diameter d80 at 80%, a pore diameter d85 at 85%, a pore diameter d90 at 90%, a pore diameter d98 at 98%, the volume of pores of more than 100 μm, (d10−d90)/d50, (d50−d90)/d50, and (d10−d50)/d50. Further calculated was σ[=log(d20)−log (d80)], which was the difference between a logarithm of the pore diameter d20 at a cumulative pore volume corresponding to 20% of the total pore volume and a logarithm of the pore diameter d80 at 80%. The porosity was calculated from the measured total pore volume, using 2.52 g/cm$^3$ as the true density of cordierite. These results are shown in Table 8.

TABLE 8

| No. | Total Pore Volume (cm$^3$/g) | Porosity (%) | Wall Thickness mil (mm) | Cell Density cpsi (cells/cm$^2$) | CTE[1] ($\times 10^{-7}$/° C.) |
|---|---|---|---|---|---|
| Example 1 | 0.675 | 63.0 | 13 (0.33) | 255 (39.5) | 11 |
| Example 2 | 0.647 | 62.0 | 13 (0.33) | 255 (39.5) | 11 |
| Example 3 | 0.503 | 55.9 | 13 (0.33) | 255 (39.5) | 10 |
| Example 4 | 0.576 | 59.2 | 13 (0.33) | 255 (39.5) | 11 |
| Example 5 | 0.490 | 55.3 | 13 (0.33) | 255 (39.5) | 10 |
| Example 6 | 0.535 | 57.4 | 11 (0.28) | 250 (38.8) | 11 |
| Example 7 | 0.713 | 64.2 | 12 (0.30) | 260 (40.3) | 10 |
| Example 8 | 0.513 | 56.4 | 12 (0.30) | 260 (40.3) | 9 |
| Example 9 | 0.610 | 60.6 | 12 (0.30) | 260 (40.3) | 11 |
| Example 10 | 0.669 | 62.8 | 12 (0.30) | 260 (40.3) | 12 |
| Com. Ex. 1 | 0.329 | 45.3 | 13 (0.33) | 255 (39.5) | 10 |
| Com. Ex. 2 | 0.787 | 66.5 | 13 (0.33) | 255 (39.5) | 10 |
| Com. Ex. 3 | 0.588 | 59.7 | 13 (0.33) | 255 (39.5) | 11 |
| Com. Ex. 4 | 0.851 | 68.2 | 12 (0.30) | 260 (40.3) | 11 |
| Com. Ex. 5 | 0.302 | 43.2 | 12 (0.30) | 260 (40.3) | 10 |
| Com. Ex. 6 | 0.462 | 53.8 | 12 (0.30) | 260 (40.3) | 13 |
| Com. Ex. 7 | 0.329 | 45.3 | 12 (0.30) | 260 (40.3) | 9 |
| Com. Ex. 8 | 0.615 | 60.8 | 12 (0.30) | 260 (40.3) | 9 |
| Com. Ex. 9 | 0.324 | 44.9 | 13 (0.33) | 255 (39.5) | 10 |
| Com. Ex. 10 | 0.626 | 61.2 | 13 (0.33) | 255 (39.5) | 11 |

Note:
[1]CTE represents a thermal expansion coefficient.

| | Pore Size (μm) | | | | | | |
|---|---|---|---|---|---|---|---|
| No. | d2 | d5 | d10 | d50 | d85 | d90 | d98 |
| Example 1 | 148 | 95 | 36.5 | 18.1 | 9.8 | 7.9 | 3.1 |
| Example 2 | 130 | 84 | 32.5 | 17.2 | 9.1 | 6.8 | 1.3 |
| Example 3 | 145 | 99 | 26.5 | 14.3 | 9.0 | 7.0 | 1.5 |
| Example 4 | 140 | 97 | 31.1 | 16.2 | 9.2 | 7.5 | 2.2 |
| Example 5 | 141 | 93 | 23.5 | 12.5 | 8.0 | 6.4 | 1.4 |
| Example 6 | 145 | 65 | 25.4 | 13.7 | 7.1 | 4.7 | 1.2 |
| Example 7 | 148 | 111 | 49.1 | 22.3 | 9.9 | 7.1 | 3.0 |
| Example 8 | 128 | 97 | 30.3 | 14.6 | 7.8 | 5.8 | 2.4 |
| Example 9 | 138 | 99 | 37.0 | 17.6 | 9.9 | 7.1 | 2.2 |
| Example 10 | 138 | 105 | 39.5 | 20.8 | 9.8 | 7.2 | 1.9 |
| Com. Ex. 1 | 78 | 48 | 13.8 | 5.1 | 4.2 | 3.1 | 0.9 |
| Com. Ex. 2 | 240 | 164 | 68.0 | 27.6 | 15.0 | 8.0 | 3.0 |
| Com. Ex. 3 | 132 | 99 | 42.0 | 17.7 | 8.5 | 5.0 | 1.8 |
| Com. Ex. 4 | 190 | 135 | 59.0 | 29.0 | 18.0 | 16.0 | 9.0 |
| Com. Ex. 5 | 102 | 38 | 14.5 | 5.8 | 3.5 | 2.0 | 1.0 |
| Com. Ex. 6 | 160 | 111 | 55.0 | 14.0 | 5.0 | 2.5 | 1.0 |
| Com. Ex. 7 | 129 | 96 | 36.0 | 16.0 | 6.0 | 3.2 | 1.5 |
| Com. Ex. 8 | 120 | 92 | 25.0 | 15.5 | 12.0 | 9.5 | 6.3 |

TABLE 8-continued

| | | | | | | |
|---|---|---|---|---|---|---|
| Com. Ex. 9 | 106 | 48 | 22.6 | 11.5 | 5.5 | 5.4 | 1.5 |
| Com. Ex. 10 | 188 | 155 | 55.0 | 21.5 | 12.0 | 9.0 | 5.0 |

| No. | (d10 − d90)/d50 | (d50 − d90)/d50 | (d10 − d50)/d50 |
|---|---|---|---|
| Example 1 | 1.58 | 0.56 | 1.02 |
| Example 2 | 1.49 | 0.60 | 0.89 |
| Example 3 | 1.36 | 0.51 | 0.85 |
| Example 4 | 1.46 | 0.54 | 0.92 |
| Example 5 | 1.37 | 0.49 | 0.88 |
| Example 6 | 1.51 | 0.66 | 0.85 |
| Example 7 | 1.89 | 0.68 | 1.20 |
| Example 8 | 1.68 | 0.60 | 1.08 |
| Example 9 | 1.70 | 0.60 | 1.10 |
| Example 10 | 1.55 | 0.65 | 0.90 |
| Com. Ex. 1 | 2.10 | 0.39 | 1.71 |
| Com. Ex. 2 | 2.17 | 0.71 | 1.46 |
| Com. Ex. 3 | 2.09 | 0.72 | 1.37 |
| Com. Ex. 4 | 1.48 | 0.45 | 1.03 |
| Com. Ex. 5 | 2.16 | 0.66 | 1.50 |
| Com. Ex. 6 | 3.75 | 0.82 | 2.93 |
| Com. Ex. 7 | 2.05 | 0.80 | 1.25 |
| Com. Ex. 8 | 1.00 | 0.39 | 0.61 |
| Com. Ex. 9 | 1.50 | 0.53 | 0.97 |
| Com. Ex. 10 | 2.14 | 0.58 | 1.56 |

| | Pore Size (μm) | | | Volume of Pores of More Than |
|---|---|---|---|---|
| No. | d20 | d80 | $\sigma^{(1)}$ | 100 μm (cm³/g) |
| Example 1 | 24.4 | 12.1 | 0.30 | 0.037 |
| Example 2 | 24.5 | 11.6 | 0.32 | 0.029 |
| Example 3 | 19.6 | 10.2 | 0.28 | 0.025 |
| Example 4 | 22.1 | 10.5 | 0.32 | 0.028 |
| Example 5 | 16.2 | 9.2 | 0.25 | 0.023 |
| Example 6 | 17.0 | 8.5 | 0.30 | 0.027 |
| Example 7 | 30.0 | 13.8 | 0.34 | 0.050 |
| Example 8 | 19.3 | 11.0 | 0.24 | 0.022 |
| Example 9 | 25.0 | 14.0 | 0.25 | 0.031 |
| Example 10 | 26.8 | 16.0 | 0.24 | 0.034 |
| Com. Ex. 1 | 10.5 | 4.6 | 0.36 | 0 |
| Com. Ex. 2 | 45.0 | 18.0 | 0.40 | 0.067 |
| Com. Ex. 3 | 27.0 | 10.5 | 0.41 | 0.028 |
| Com. Ex. 4 | 39.0 | 20.0 | 0.29 | 0.064 |
| Com. Ex. 5 | 9.6 | 4.5 | 0.33 | 0.007 |
| Com. Ex. 6 | 30.0 | 6.5 | 0.66 | 0.030 |
| Com. Ex. 7 | 27.0 | 7.8 | 0.54 | 0.015 |
| Com. Ex. 8 | 23.0 | 12.5 | 0.26 | 0.023 |
| Com. Ex. 9 | 18.0 | 9.6 | 0.27 | 0.008 |
| Com. Ex. 10 | 32.0 | 14.0 | 0.36 | 0.046 |

Note:
$^{(1)}\sigma = \log(d20) - \log(d80)$.

With respect to another ceramic honeycomb filter produced in each of Examples 1-10 and Comparative Examples 1-10, initial pressure loss, pressure loss after capturing PM (pressure loss when 2 g/L of soot was captured), and a number-based PM-capturing ratio at an early stage were measured by the following methods. The results are shown in Table 9.

(a) Initial Pressure Loss

The initial pressure loss was measured on a ceramic honeycomb filter fixed to a pressure loss test stand, to which air was supplied at a flow rate of 10 Nm³/min, and expressed by pressure difference between the inlet side and the outlet side (pressure loss). The initial pressure loss was evaluated by the following standards:

Poor: The pressure loss was more than 1.0 kPa,
Fair: It was more than 0.8 kPa and 1.0 kPa or less,
Good: It was more than 0.6 kPa and 0.8 kPa or less, and
Excellent: It was 0.6 kPa or less.

(b) Pressure Loss after Capturing PM

The pressure loss after capturing PM was measured on a ceramic honeycomb filter fixed to a pressure loss test stand, to which combustion soot having an average particle diameter of 0.042 μm was supplied at a speed of 3 g/h together with air at a flow rate 10 Nm³/min. The pressure loss after capturing PM was expressed by pressure difference (pressure loss) between the inlet side and the outlet side when 2 g of soot was accumulated per 1 L of a filter volume. The soot capturing pressure loss was evaluated by the following standards:

Poor: The pressure loss was more than 1.5 kPa,
Fair: It was more than 1.3 kPa and 1.5 kPa or less,
Good: It was more than 1.0 kPa and 1.3 kPa or less, and
Excellent: It was 1.0 kPa or less.

(c) Number-Based PM-Capturing Ratio at an Early Stage

Combustion soot having an average particle diameter of 0.042 μm was introduced at a speed of 3 g/h, together with air at a flow rate of 10 Nm³/min, into a ceramic honeycomb filter fixed to a pressure loss test stand, to measure the number of combustion soot particles flowing into and from the honeycomb filter per 1 minute by a scanning mobility particle sizer (SMPS) (Model 3936 available from TIS). The number-based PM-capturing ratio at an early stage was calculated from the number $N_{in}$ of combustion soot particles flowing into the honeycomb filter, and the number $N_{out}$ of combustion soot particles flowing from the honeycomb filter for 1 minute between 3 minutes and 4 minutes after the start, by the formula of $(N_{in}-N_{out})/N_{in}$. The PM-capturing ratio was evaluated by the following standards:

Excellent The PM-capturing ratio was 98% or more,
Good It was 96% or more and less than 98%,
Fair It was 95% or more and less than 96%, and
Poor It was less than 95%.

TABLE 9

| | Pressure Loss | | |
|---|---|---|---|
| No. | Initial | After Capturing PM$^{(1)}$ | PM-Capturing Ratio$^{(2)}$ |
| Example 1 | Excellent | Excellent | Good |
| Example 2 | Excellent | Excellent | Good |
| Example 3 | Good | Fair | Excellent |
| Example 4 | Excellent | Good | Excellent |
| Example 5 | Fair | Fair | Good |
| Example 6 | Good | Good | Good |
| Example 7 | Excellent | Excellent | Fair |
| Example 8 | Excellent | Excellent | Excellent |
| Example 9 | Excellent | Excellent | Excellent |
| Example 10 | Excellent | Excellent | Excellent |
| Com. Ex. 1 | Poor | Poor | Poor |
| Com. Ex. 2 | Good | Excellent | Poor |
| Com. Ex. 3 | Poor | Good | Poor |
| Com. Ex. 4 | Good | Good | Poor |
| Com. Ex. 5 | Poor | Poor | Fair |
| Com. Ex. 6 | Poor | Poor | Poor |
| Com. Ex. 7 | Poor | Poor | Good |
| Com. Ex. 8 | Fair | Poor | Fair |
| Com. Ex. 9 | Poor | Poor | Fair |
| Com. Ex. 10 | Good | Fair | Poor |

Note:
$^{(1)}$Pressure loss when 2 g/L of soot was captured.
$^{(2)}$A number-based PM-capturing ratio at an early stage Table 9 indicates that the ceramic honeycomb filters of Examples 1-10 (within the present invention) have improved number-based PM-capturing ratios at an early stage while keeping low pressure loss.

The ceramic honeycomb filter of Comparative Example 1, which used only 2.4 parts by mass of the pore-forming material D having an median particle diameter of 25 μm (less than 35 μm), together with silica, talc and alumina having relatively small particle diameters, had a small median pore diameter, low pressure loss characteristics, and a low PM-capturing ratio.

The ceramic honeycomb filter of Comparative Example 2, which used the pore-forming material E having a median particle diameter of 54 μm (more than 53 μm) and a relatively broad particle diameter distribution, together with silica, talc and alumina having relatively large particle diameters, had a large median pore diameter, resulting in a low PM-capturing ratio, despite good pressure loss characteristics.

The ceramic honeycomb filter of Comparative Example 3, which used the pore-forming material F having a median particle diameter of 36 μm and a slightly broad particle diameter distribution, together with the silica F having a relatively broad particle diameter distribution and the talc F having a relatively sharp particle diameter distribution, had a broad pore diameter distribution, resulting in poor initial pressure loss and number-based PM-capturing ratio.

The ceramic honeycomb filter of Comparative Example 4, which used the pore-forming material G having a median particle diameter of 57 μm (more than 53 μm), together with silica, talc and alumina having relatively large particle diameters, had a large median pore diameter, resulting in a low PM-capturing ratio despite good pressure loss characteristics.

The ceramic honeycomb filter of Comparative Example 5, which used only 1.8 parts by mass of the pore-forming material H having a median particle diameter of 25 μm (less than 35 μm), together with silica, talc and alumina having relatively small particle diameters, had a small median pore diameter, resulting in poor pressure loss characteristics.

The ceramic honeycomb filter of Comparative Example 6, which used the pore-forming material I of graphite, together with silica, talc and alumina having relatively small particle diameters, had an extremely broad pore diameter distribution, resulting in poor pressure loss characteristics and a low PM-capturing ratio.

The ceramic honeycomb filter of Comparative Example 7, which used the pore-forming material J of a solid resin, had low porosity and a broad pore diameter distribution, resulting in large initial pressure loss and large pressure loss after capturing PM.

The ceramic honeycomb filter of Comparative Example 8, which used silica having a relatively small median particle diameter, had a too narrow pore diameter distribution, resulting in large pressure loss after capturing PM.

The ceramic honeycomb filter of Comparative Example 9, which used only 2.0 parts by mass of the pore-forming material H having a median particle diameter of 25 μm (less than 35 μm), had low porosity, resulting in poor initial pressure loss and poor pressure loss after capturing PM.

The ceramic honeycomb filter of Comparative Example 10, which used silica, talc and alumina having relatively large particle diameters, had a pore diameter distribution broad on the large diameter side, resulting in a low PM-capturing ratio despite good pressure loss characteristics.

Effect of the Invention

A filter constituted by the ceramic honeycomb structure of the present invention can effectively capture namo-sized PM largely affecting the number of particles in an exhaust gas, even at an early stage of use before PM is accumulated (when a ceramic honeycomb filter starts to be freshly used or reused after regeneration), resulting in an improved number-based capturing ratio of PM, without deteriorating pressure loss characteristics when captured PM is accumulated. Accordingly, it can meet stricter exhaust gas regulations.

What is claimed is:

1. A method for producing a ceramic honeycomb structure comprising the steps of extruding a moldable material comprising a ceramic material, and a pore-forming material constituted by hollow resin particles, to form a predetermined green body, and drying and sintering said green body;
    said moldable material comprising 3-9% by mass of said pore-forming material per 100% by mass of said ceramic material;
    in a curve of a cumulative volume to a particle diameter in said pore-forming material, a median particle diameter D50 being 35-53 μm, a particle diameter D5 at a cumulative volume corresponding to 5% of the total volume being 12-27 μm, a particle diameter D10 at a cumulative volume corresponding to 10% of the total volume being 15-30 μm, a particle diameter D90 at a cumulative volume corresponding to 90% of the total volume being 58-75 μm, a particle diameter D95 at a cumulative volume corresponding to 95% of the total volume being 65-85 μm, and D50/(D90−D10) being 0.85-1.30;
    said ceramic material comprising 15-25% by mass of silica, 40-43% by mass of talc, and 15-30% by mass of alumina, based on 100% by mass of said ceramic material;
    said silica having a median particle diameter D50 of 15-30 μm, D10 of 10-20 μm, and D90 of 40-60 μm, the percentage of particles having diameters of 5 μm or less being 1% or less by mass, the percentage of particles having diameters of 10 μm or less being 3% or less by mass, the percentage of particles having diameters of 100 μm or more being 3% or less by mass, and the percentage of particles having diameters of 200 μm or more being 1% or less by mass, and a particle diameter distribution deviation SD $[=\log(D80)-\log(D20)]$ being 0.4 or less, wherein D20 represents a particle diameter at a cumulative volume corresponding to 20% of the total volume, D80 represents a particle diameter at a cumulative volume corresponding to 80% of the total volume, in a curve of a cumulative volume to a particle diameter, and D20<D80;
    said talc having a median particle diameter D50 of 5-15 μm, D10 of 10 μm or less, and D90 of 25 μm or more; and
    said alumina having a median particle diameter D50 of 3-10 μm, and D90 of 60 μm or less.

2. The method for producing a ceramic honeycomb structure according to claim 1, wherein said moldable material comprises 4-8% by mass of said pore-forming material per 100% by mass of said ceramic material.

* * * * *